United States Patent
Neubauer

(10) Patent No.: US 10,248,252 B2
(45) Date of Patent: Apr. 2, 2019

(54) CONTROL ELEMENT WITH HAPTICALLY MOVABLE TOUCHPAD OR TOUCHSCREEN AND WITH MAGNETIC RETURN

(71) Applicant: PREH GMBH, Bad Neustadt a. d. Saale (DE)

(72) Inventor: Steffen Neubauer, Hohenroth (DE)

(73) Assignee: PREH GMBH, Bad Neustadt a. d. Saale (DE)

( * ) Notice: Subject to any disclaimer, the term of this patent is extended or adjusted under 35 U.S.C. 154(b) by 0 days.

(21) Appl. No.: 15/802,029

(22) Filed: Nov. 2, 2017

(65) Prior Publication Data

US 2018/0129342 A1    May 10, 2018

(30) Foreign Application Priority Data

Nov. 9, 2016  (DE) .................... 10 2016 121 425

(51) Int. Cl.
  *G06F 3/01*   (2006.01)
  *G06F 3/041*  (2006.01)
  *G06F 3/0354* (2013.01)

(52) U.S. Cl.
  CPC ........... *G06F 3/0416* (2013.01); *G06F 3/016* (2013.01); *G06F 3/03547* (2013.01)

(58) Field of Classification Search
  None
  See application file for complete search history.

(56) References Cited

U.S. PATENT DOCUMENTS

| 8,614,683 | B2* | 12/2013 | Ng ............... B60K 35/00 345/1.1 |
| 2016/0179200 | A1* | 6/2016 | Billington ....... G06F 3/016 345/173 |
| 2017/0012516 | A1* | 1/2017 | Xu ............... H02K 11/30 |

FOREIGN PATENT DOCUMENTS

DE    102014019041    3/2016

* cited by examiner

*Primary Examiner* — Nicholas J Lee
(74) *Attorney, Agent, or Firm* — M&B IP Analysts, LLC

(57) ABSTRACT

The present disclosure relates to a control element, comprising a carrier, an actuating member defining a touch-sensitive input surface, whereby the actuating member is movably installed on the carrier substantially parallel to the plane formed by the touch-sensitive input surface in a movement direction; an actuator to provide a movement from a resting position in movement direction of the actuating member relative to the carrier for providing a haptic feedback, whereby furthermore at least one permanent-magnet pair is arranged between the carrier and the actuating member to guide, in particular to stabilize the movement of the actuating member and/or the return of the actuating member into the resting position.

10 Claims, 3 Drawing Sheets

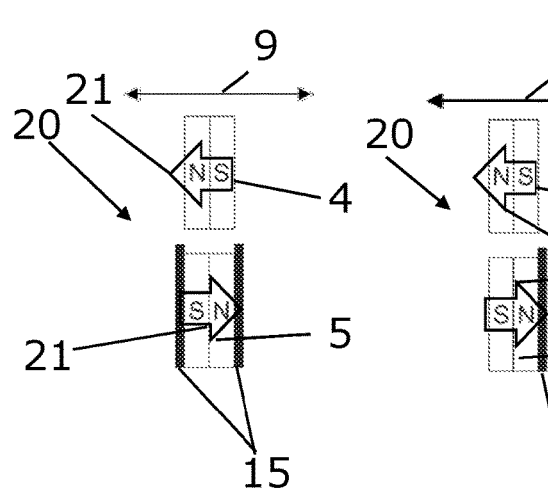
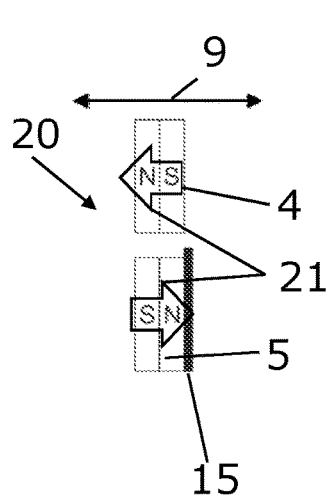
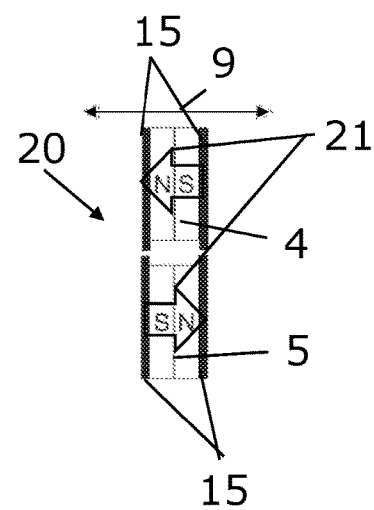
Fig. 6a  Fig. 6b  Fig. 6c
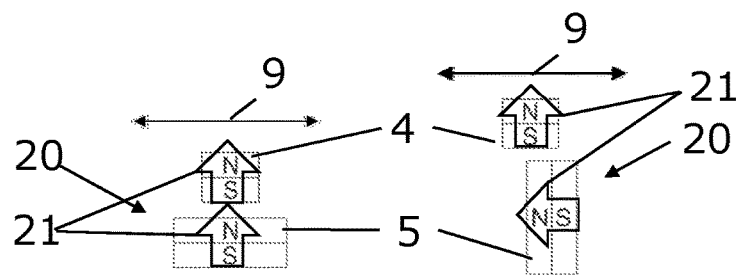
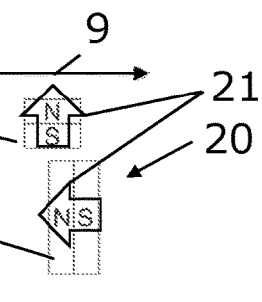
Fig. 6d  Fig. 6e

CONTROL ELEMENT WITH HAPTICALLY MOVABLE TOUCHPAD OR TOUCHSCREEN AND WITH MAGNETIC RETURN

This application claims priority to the German Application No. 10 2016 121 425.6, filed Nov. 9, 2016, now pending, the contents of which are hereby incorporated by reference.

The present disclosure relates to a control element with a movably mounted actuating member and an actuator to drive the actuating member for the purpose of generating a haptic feedback. In known control elements, deflection is usually caused by electromagnetic forces, but the return to the initial position is usually caused purely by elastically deformable return means such as springs and such. However, this has the disadvantage that the course of movement can only be varied to a limited extent by controlling the excitation. Furthermore, any mechanical return is subject to certain wear and tear. At the same time, the control element should be of compact design, thus requiring less space and less weight, and it should be highly resistant to wear and tear and to temperature. This applies in particular to applications in automotive engineering.

For that reason, there is a demand for a control element with high integration density, low wear and tear and of light weight which has a reliable reproducible return to the appropriate resting position, and whose design can be almost randomly varied. This object is achieved by a control element according to claim 1. Advantageous embodiments are the object of the sub-claims. One equally advantageous embodiment is the object of the subordinate process claim. It should be noted that the characteristics individually mentioned in the claims can be combined with each other in any technologically meaningful manner, showing further embodiments of the present disclosure. The description, with particular reference to the drawings, additionally characterizes and specifies the present disclosure.

The present disclosure relates to a control element comprising a carrier and an actuating member. The actuating member comprises a touch-sensitive input surface. The input surface can be a curved surface. Preferably, the input surface is plane. The actuating member is mounted to slide and move on the carrier in one direction, substantially parallel to the plane formed by the input surface. According to the present disclosure, the term "carrier" should be interpreted such that it can be of any external shape. For example, the carrier can be meant to fix the control element to an interior lining or a trim of the passenger compartment. For example, in case of a curved input surface, the said plane defining the direction of movement is defined by the external circumference of the input surface. For example, the actuator part with a touch-sensitive input surface can be a touchpad or a touch display.

The formulation "substantially parallel" as used in this description is to ensure that even a pivotable or pendulously suspended bearing of the actuating member on the carrier is included according to the present disclosure. According to an advantageous embodiment, a purely translatory motion of the actuating member is intended—as it is, for example, with a floating bearing arrangement.

Also according to the present disclosure, at least one permanent magnet is arranged between the carrier and the actuating member for guiding, in particular for stabilizing the movement of the actuating member and/or the return of the actuating member into the resting position. Such a magnetic alternating effect is subject to little wear and tear, and by using permanent magnets, a space-saving solution is achieved for a generic control element. By means of the permanent-magnet pair, due to the variety of arrangements and dimensions, almost any kind of force displacement curves—also called the recovery behaviour—can be achieved which differs from the linear course that would result from an ideally elastic return by means of springs. In addition, due to the two diametrically opposed deflection directions from the resting position, it is relatively easy to design for an asymmetrical return behaviour.

Guidance is understood to be a magnetic interaction caused by the permanent-magnet pair between the carrier and the actuating member, which guides the actuating member on a predetermined path of movement. Stabilization is understood to be a magnetic form of guidance provided by the permanent-magnet pair between the carrier and the actuating member which aligns the movement of the actuating member with the direction of movement followed by the actuator described below and which ensures that this direction of movement is maintained. Thus, stabilization is a guiding movement in which, for example, an original movement, as transversal as possible, is desired, and in which deviating movement directions, such as pendulous modes or rotational movements orthogonal to the direction of movement, are minimized or suppressed.

Furthermore, the inventive solution has the advantage that the control element can be easily adapted to certain installation situations and only by means of designing the permanent-magnet pair. For example, the requirement can be to minimize the gap dimensions needed for deflection between the actuating member and the trim surrounding the actuating member while striving for a maximum speed of deflection. With conventional springs, this adaptation is only possible to a limited degree because they usually have a linear force displacement curve.

According to the present disclosure, it is not absolutely necessary to do without any additional return and guidance means; for example, other return and/or guidance means can also be provided. Also for example, return and guidance forces resulting from elastic deformation are active to cause the independent return, i.e. a return caused without activation of the actuator described below into a resting position prior to deflection.

To affect the movement of the actuating member driven electrically in the direction of its degree of freedom, the present disclosure provides that an actuator is provided to affect a movement in the direction of the actuating member relative to the carrier. The motoric movement serves to provide a haptic feedback such as by means of a movement impulse in a first movement direction followed by a return movement in the opposite direction of movement. The drive parallel to the input surface has the advantage that when it is excited by the actuator, the comparatively large input surface does not sound like the blast of a loudspeaker membrane.

For example, the actuator according to the present disclosure has at least one solenoid that is electrified in case of a haptic feedback, with at least one spool and generating an electric field, with the spool interacting with an armature on the actuating member via the magnetic field to drive and deflect the actuating member from the resting position relative to the carrier. For example, the actuator according to the present disclosure is arranged in the interspace defined by the carrier and the actuating member.

According to one preferred embodiment, the permanent-magnet pair is formed by two permanent magnets positioned antipolarly opposite each other in resting position. For example, the permanent magnet can be aligned such that a magnetic north pole of one permanent magnet is arranged opposite the magnetic south pole of the other permanent magnet of the permanent-magnet pair.

Preferred is the magnet alignment of the permanent magnets forming poles such that the poles of both permanent magnet are antipolarly opposite each other in resting position. The magnet alignment means the central connecting line of each permanent magnet between its magnetic south pole and its magnetic north pole. That embodiment has the advantage that with increasing deflection, the returning force has a local maximum resulting from the circumstance that an equipolar state is passed and a state of repulsion is reached which limits deflection. This is also an advantage when the magnet alignment is parallel as well as orthogonal to the direction of movement.

According to another embodiment, the magnet alignment of at least one permanent magnet is orthogonal or parallel to the direction of movement. For example, both permanent magnets can be arranged such that both magnet alignments are parallel to each other.

According to another embodiment, a pole plate, also called a stability plate, i.e. a plate of soft-magnetic material, is attached to at least one permanent magnet of the permanent-magnet pair. This helps to achieve a magnetic field form and bundling for adjusting the return effect selectively.

Preferably, the pole surfaces of the permanent magnets defining a permanent-magnet pair which oppose each other are arranged congruently and even more preferably brought to congruence in the resting position such that for example they achieve a linear force displacement curve in reference to deflection.

In another preferred embodiment, the mutually opposite pole surfaces of the permanent magnets forming a permanent-magnet pair are not congruent and/or offset to each other in resting position in the direction of movement, to vary the return behaviour. For example, the different size of opposite pole surfaces of the two permanent magnets forming the permanent-magnet pair reaches a relatively extensive area where the return force is substantially linearly dependent on deflection. For example, due to an offset arrangement, an asymmetrical return behaviour is achieved with reference to the two diametrically opposite deflection directions from the resting position.

For example, an air gap, i.e. a clearance measuring about several tenths of mm, is provided between the permanent magnets of the permanent-magnet pair. Preferably however, the permanent magnets of the permanent-magnet pair are in contact with each other. For example, to reduce gliding friction, at least the contact surfaces of the permanent magnets are coated with a material containing polytetrafluorethylene.

According to another preferred embodiment, the permanent magnets of the permanent-magnet pair are symmetrical formed and arranged in terms of their exterior dimensions in resting position, for example differing only in their magnet alignment.

In another embodiment, the magnet alignment of the permanent magnets of the permanent-magnet pair is parallel to the direction of movement while the magnet alignment is vertical to the direction of movement.

Another preferred variation provides that the permanent magnets of the permanent-magnet pair are arranged and formed such that guidance, in particular stabilization is greater in orthogonal direction to the direction of movement than a return into resting position. In other words, the guiding force caused by the permanent-magnet pair that is acting orthogonal to the direction of movement, in particular the stabilizing force, is greater with the same deflection than the return force acting in the direction of movement that is caused by the permanent-magnet pair.

The present disclosure also refers to the use of the control element in one of the above-described embodiments in a motor vehicle.

The present disclosure is described with reference to the drawings shown below. The drawings are to be understood only as examples, showing only preferred versions of embodiments, where FIG. 1 shows a sectional view of a first embodiment of the control element according to the present disclosure;

Figures 4A, 4B:
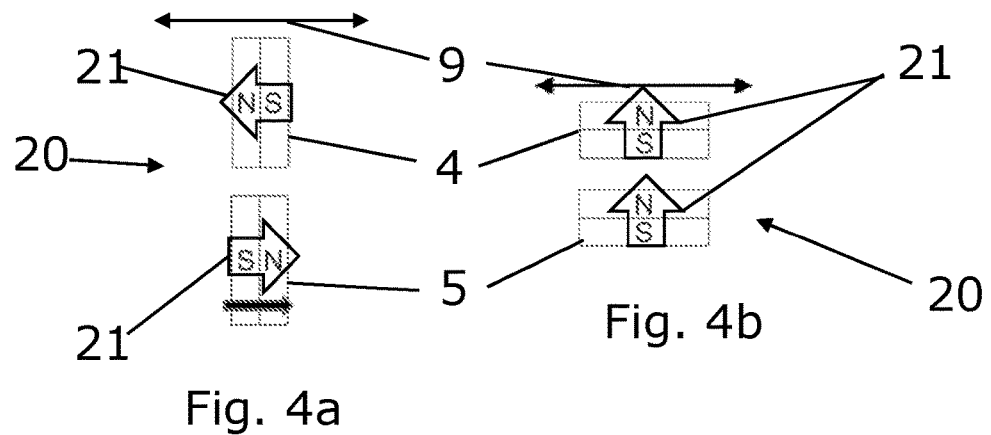
Figure 5:
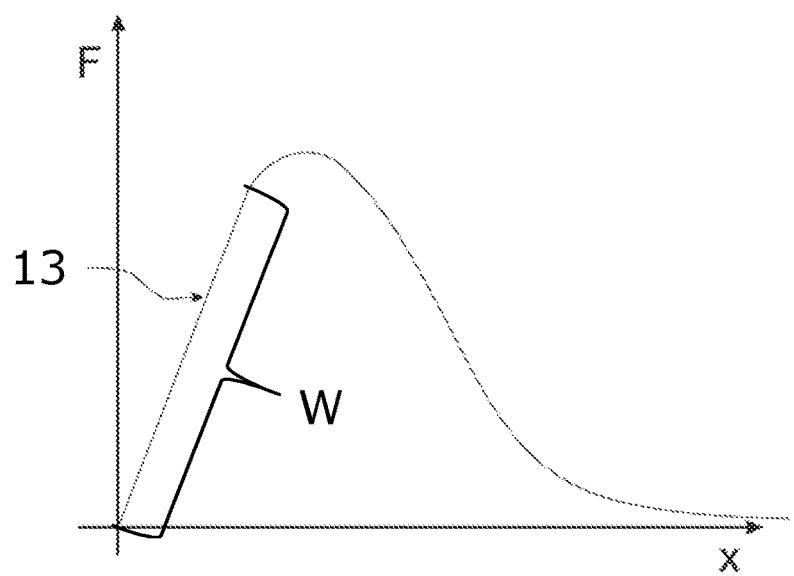

FIGS. 4*a* and 4*b* show schematic views of the inventive arrangement situations of the permanent-magnet pairs;

FIG. 5 shows a schematic force displacement curve:

FIGS. 6*a* to 6*e* show further schematic views of the inventive arrangement situations of the permanent-magnet pairs.

Figure 1:
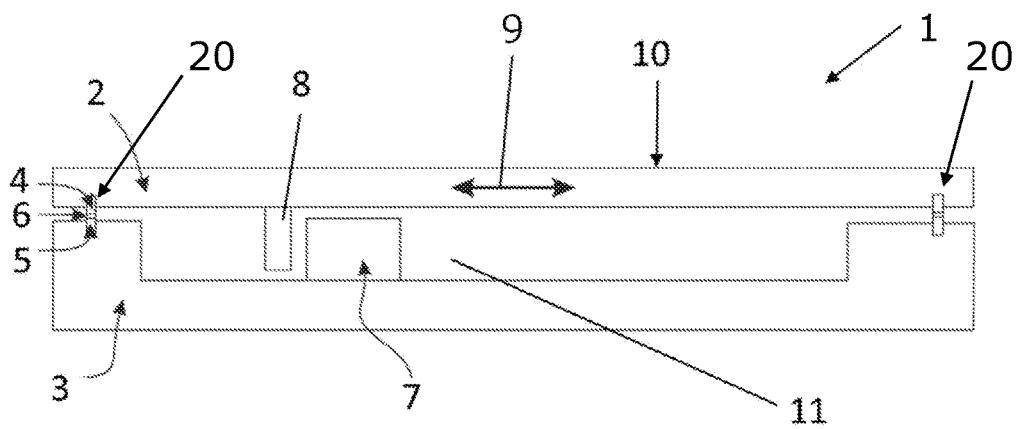

FIG. 1 shows a first embodiment of the inventive control element 1. It shows a carrier 3 for fastening to a middle console (not shown) or to an interior-space trim of a motor vehicle. Mounted to this carrier 3 is an actuating member 2 which defines a touch-sensitive input surface 10 (facing the user). For example, the actuating member 2 can be a touchscreen, i.e. a combination of a touch-sensitive Input surface and an electronic pixel matrix display, or a touchpad without display. The actuating member 2 is deflected by means of an actuator 7, 8 parallel to a touch-sensitive input surface 10 in direction 9, i.e. from a resting position, to generate a haptic feedback such as in case of a detected contact with the touch-sensitive input surface. For this, the actuator 7, 8 accommodated in an interspace 11 between carrier 3 and actuating member 2 comprises a solenoid 7 on the carrier side and an armature 8 on the side of the actuating member, which interact magnetically with each other. To guide the actuating member 2 during deflection and to return the actuating member 2 into a monostable resting position, several permanent-magnet pairs 20 are provided, each of which is defined by a first permanent magnet 4 and a second permanent magnet 5.

In the embodiment shown in FIG. 1, the two permanent magnets 4, 5 are in touch contact with each other whereby the touch surface of at least one of the permanent magnets 4, 5*d* of the permanent-magnet pair 20 is provided with a friction-reducing layer, for example with a layer containing polytetrafluorethylene. For example, the permanent magnets 4, 5 can be connected by means of an adhesive layer 6 (not shown in detail) with the actuating member 2 or with the carrier 3 and arranged opposite each other in the resting position shown in FIG. 1.

With reference to the user looking at input surface 10, the permanent magnet pairs 20 are arranged below the actuating member 2, more exactly below the marginal sector of the input surface 10.

Figure 2:
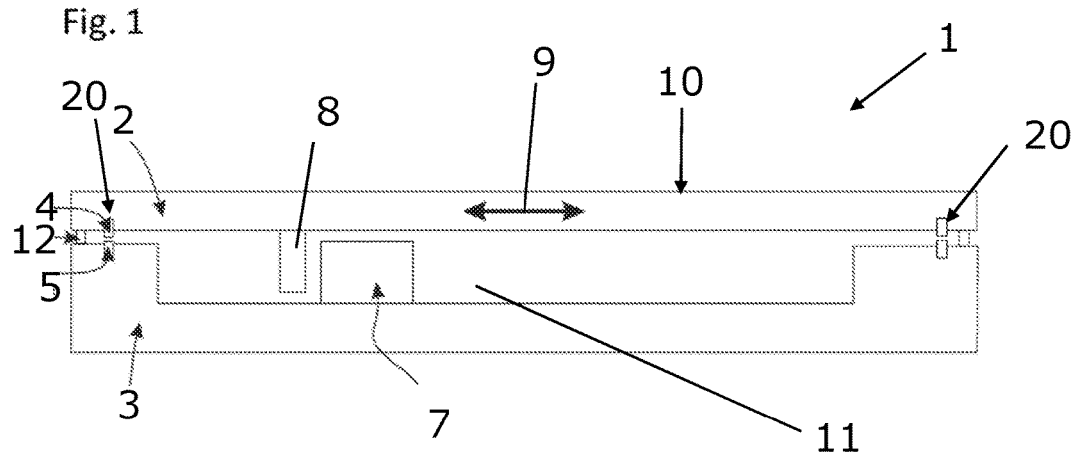
FIG. 2 shows a sectional view of a second embodiment of the control element according to the present disclosure.

FIG. 2 shows a second embodiment of the inventive control element 1. It differs from the embodiment shown before in that the permanent magnets 4, 5 of the several permanent-magnet pairs 20 are not in touch contact but separated from each other by an air gap. Furthermore, a bearing 12 is provided. For example, this bearing 12 can be formed such that it causes no return effect and that it can be designed, for example, as a roller bearing, or it can supplement or modulate the return provided by the permanent-magnet pair 20 or by the several permanent-magnet pairs 20. For example, the bearing may be a spring or an elastomer element arranged between carrier 3 and actuating member 2.

Figure 3:
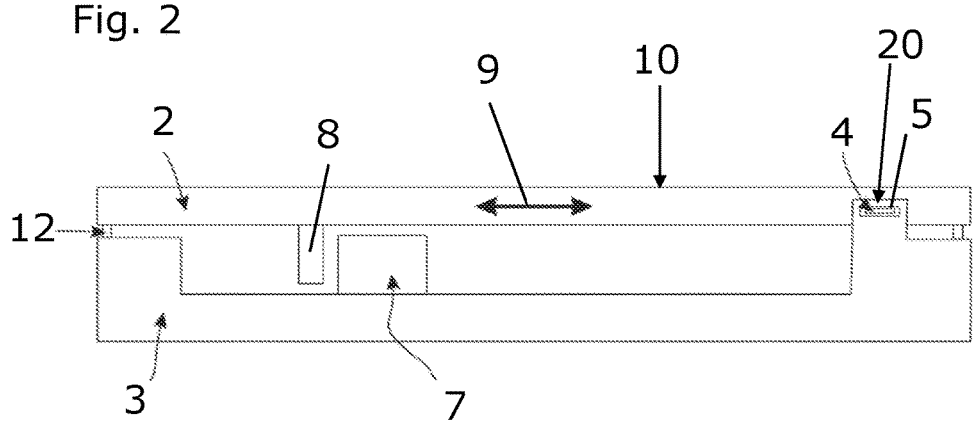
FIG. 3 shows a sectional view of a third embodiment of the control element according to the present disclosure.

FIG. 3 shows a third embodiment of the inventive control element 1. It differs from the above-described first embodiment in that the permanent magnets 4, 5 of the several permanent-magnet pairs 20 are not in touch contact either, and that furthermore a bearing 12 is provided. This bearing 12 may have no return effect and may, for example, be designed as a roller bearing or may supplement or modify the return affected by the permanent-magnet pair 20. For example, the bearing may be a spring or an elastomer element arranged between carrier 3 and actuating member 2. Furthermore, in this case the permanent-magnet pairs 20, with reference to the user looking at the input surface 10, are not arranged below the actuating members 2 as in the embodiments of FIGS. 1 and 2, but on top of the actuating member 2 where they substantially have the function of stabilizing and guiding the direction of movement 9 originally provided by the actuator during the deflection caused by actuator 7, 8.

FIGS. 4a and 4b show possible inventive arrangements and embodiments of the permanent-magnet pair 20 formed of permanent magnets 4, 5. In this case, the permanent magnets 4, 5 of the permanent-magnet pair 20, apart from their polar arrangement and thus apart from their magnet alignment 21, are arranged mirror-symmetrically to each other. Thus the opposite polar surfaces of the opposite permanent magnets 4, 5 of the permanent-magnet pair 20 are not only congruent, but also brought to congruence in the shown resting position. For example, the magnet alignment 21 in case of the embodiment shown in FIG. 4a is parallel to movement direction 9, but opposite, such that in the shown resting position, uneven poles are always opposing each other.

The embodiment described above is characterized by a force displacement curve 8, here also called return behaviour, as is shown in the functional diagram of FIG. 5 where the return force F is plotted in dependence on deflection X. This causes a linear return up to an overlapping of 50% of the relative arrangement of the two permanent magnets 4, 5 of the permanent-magnet pair 20, whereby after achieving a local maximum, the return force F begins to drop. In a preferred embodiment of the inventive control element 1, this area, where the return force F and deflection X are in a linear relationship, is used as a working area W for the deflection caused by the actuator 7, 8, for example by controlling actuator 7, 8 accordingly.

FIGS. 6a to 6e each show further inventive embodiments of the permanent-magnet pair 20. For example, in the embodiments of FIGS. 6a to 6c, the magnet alignment 21 of both permanent magnets 4, 5 of the permanent-magnet pair 20 is parallel to the movement direction 9. In this case, the return caused by the permanent-magnet pair 20 is influenced by the provision of pole plates 15, for example to achieve a non-linear force displacement curve and/or to achieve an asymmetrical behaviour of the return force depending on the deflection with regard to the different diametrically opposite deflection directions from the resting position, as shown by the double arrow 9. Thus, in the version shown in FIG. 6a, a pole plate 15 is provided at both poles of only one permanent magnet 5 of the permanent-magnet pair 20.

In the embodiment shown in FIG. 6b, a pole plate 15 is provided only at one pole of a permanent magnet 5 of the permanent-magnet pair 20, thus to achieve a different return behaviour concerning the two possible opposite deflections from the resting position.

FIG. 6d shows an embodiment of the permanent-magnet pair 4, 5 in which due to the difference in size of the pole surfaces opposing each other in resting position and the middle arrangement of the smaller pole surface compared with the larger pole surface of the two permanent magnets 4, 5 forming a permanent-magnet pair 20 with regard to the symmetrical return behaviour of the two deflection directions is achieved, but at the same time, a comparatively extensive working area is achieved in which the return force is linearly dependent on the deflection.

FIG. 6e on the other hand shows an embodiment in which the magnet alignments 21 of the two permanent magnets 4, 5 of the permanent-magnet pair 20 are orthogonal to each other and where they are furthermore arranged offset in resting position, such that only one pole of permanent magnet 5 is opposite an uneven pole of permanent magnet 4 of the same permanent-magnet pair 20. In this embodiment, too, an asymmetrical return behaviour is achieved with regard to the deflection directions 9 from the resting position.

The invention claimed is:

1. A control element, comprising:
a carrier;
an actuating member defining a touch-sensitive input surface characterized in that the actuating member is movably installed on the carrier in a movement direction substantially parallel to the plane formed by the touch-sensitive input surface;
an actuator to provide a movement from a resting position in movement direction of the actuating member relative to the carrier to provide a haptic feedback, furthermore characterized in that at least one permanent-magnet pair is arranged between the carrier and the actuating member for guiding, preferably stabilizing the movement of the actuating member and/or the return of the actuating member unto the resting position, wherein the permanent magnets of the permanent-magnet pair are arranged and formed such that guidance and, in particular, stabilization in a direction orthogonal to the movement direction is greater than the return into resting position from the movement position.

2. The control element of claim 1, wherein the permanent-magnet pair comprises two permanent magnets positioned antipolarly opposite each other in resting position.

3. The control element of claim 1, wherein the magnet alignment of the permanent magnets forming the permanent-magnet pair is such that both poles of each permanent magnet of the permanent-magnet pair are antipolarly opposed to each other.

4. The control element of claim 1, wherein the magnet alignment of at least one permanent magnet of the permanent-magnet pair is orthogonal or parallel to the movement direction.

5. The control element of claim 1, wherein the magnet alignments of the permanent magnets of the permanent-magnet pair are orthogonal to each other.

6. The control element of claim 1, wherein a pole plate is arranged on at least one of the permanent magnets of the permanent-magnet pair.

7. The control element of claim 1, wherein the permanent magnets of the permanent-magnet pair are in touch contact with each other.

8. The control element of claim 1, wherein in resting position, the exterior dimensions of the permanent magnets of the permanent-magnet pair are symmetrically formed and symmetrically arranged in relation to each other.

9. The control element of claim 1, wherein the permanent magnets of the permanent-magnet pair are asymmetrically formed and/or asymmetrically arranged in relation to each other.

10. Application of the control element according to claim 1, in a motor vehicle.

\* \* \* \* \*